United States Patent [19]

Kolchinsky et al.

[11] Patent Number: 4,544,128
[45] Date of Patent: Oct. 1, 1985

[54] CARTRIDGE SOLENOID VALVE WITH MANUAL OVERRIDE

[75] Inventors: Abel E. Kolchinsky, Glenview; Shaukat A. Kazi, Chicago, both of Ill.

[73] Assignee: Imperial Clevite Inc., Glenview, Ill.

[21] Appl. No.: 469,469

[22] Filed: Feb. 24, 1983

[51] Int. Cl.[4] .............................................. F16K 31/05
[52] U.S. Cl. ................................. 251/30.01; 251/32; 251/130
[58] Field of Search .................... 251/30, 32, 100, 129, 251/130

[56] References Cited

U.S. PATENT DOCUMENTS

| | | | |
|---|---|---|---|
| 2,020,833 | 11/1935 | Hansen | 251/130 |
| 2,155,358 | 4/1939 | Cyr | 251/130 |
| 2,238,401 | 4/1941 | Shaw | 251/130 |
| 2,258,336 | 10/1941 | Moore | 251/130 |
| 2,285,323 | 6/1942 | Beekley et al. | 251/30 |
| 2,363,063 | 11/1944 | Hildebrecht | 251/130 |
| 2,575,272 | 11/1951 | Harris | 251/30 |
| 2,665,708 | 1/1954 | Ghormley | 251/30 |
| 2,695,154 | 11/1954 | Dillman | 251/130 |
| 3,016,920 | 1/1962 | Thomsen et al. | 251/130 |
| 3,084,676 | 4/1963 | Herion et al. | 251/130 |
| 3,092,145 | 6/1963 | Brinkel | 251/129 |
| 3,224,815 | 12/1965 | Horowitz | 251/100 |
| 3,306,570 | 2/1967 | Cooksley | 251/130 |
| 3,407,845 | 10/1968 | Cooksley | 251/130 |
| 3,477,687 | 11/1969 | Doutt | 251/100 |
| 3,604,681 | 9/1971 | Verderber | 251/100 |
| 3,829,059 | 8/1974 | Rupert | 251/130 |

FOREIGN PATENT DOCUMENTS

| | | | |
|---|---|---|---|
| 642746 | 1/1964 | France | 251/100 |
| 302006 | 10/1932 | Italy | 251/100 |

Primary Examiner—Alan Cohan
Assistant Examiner—John A. Rivell
Attorney, Agent, or Firm—Russell E. Baumann

[57] ABSTRACT

A valve structure (10) wherein a main valve (11) is controlled by a pilot valve (15) which is normally selectively positioned by the coaction of a solenoid coil (17) and plunger (16). A manual override structure (22) is provided for selectively permitting normal control of the pilot valve by the solenoid, or causing a fast repositioning of the plunger against the action of the normal biasing spring 50 thereof.

14 Claims, 3 Drawing Figures

U.S. Patent     Oct. 1, 1985     4,544,128
FIG. 1
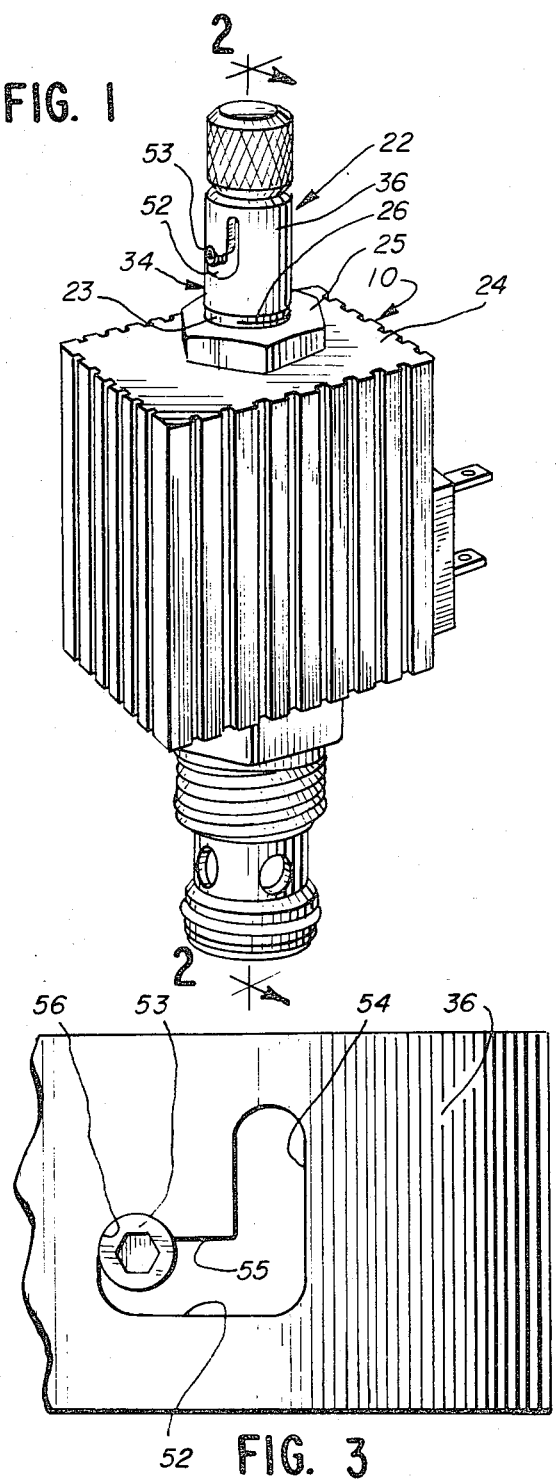
FIG. 3
FIG. 2
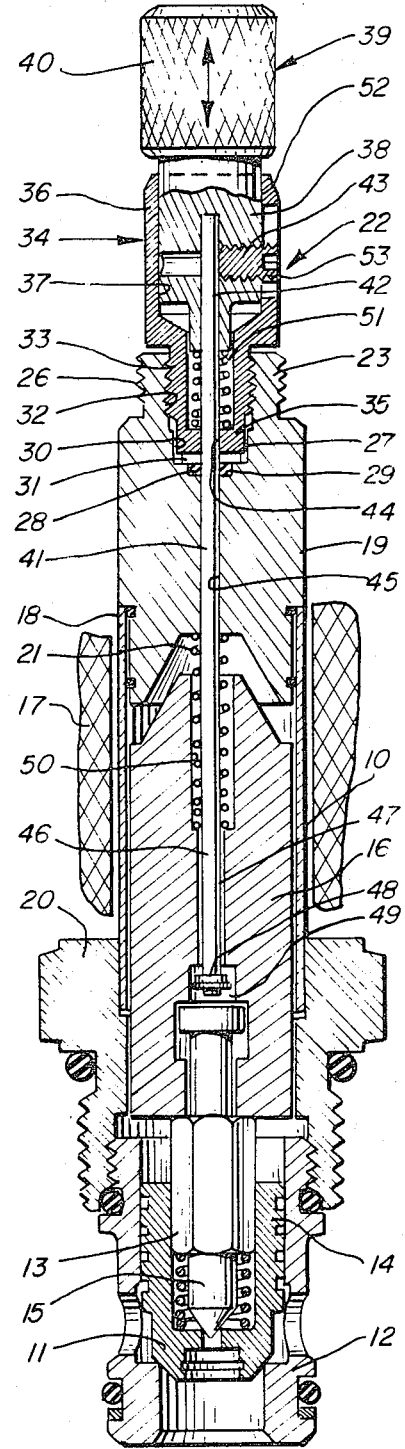

CARTRIDGE SOLENOID VALVE WITH MANUAL OVERRIDE

DESCRIPTION

1. Technical Field

This invention relates to cartridge solenoid valves and in particular to cartridge solenoid valves with manual overrides.

2. Background Art

In one form of poppet, or spool, valve, of the cartridge solenoid type, a pilot valve is selectively positioned by means of a plunger for controlling the open and closed condition of an associated main valve. The plunger, in turn, is selectively positioned by a solenoid coil and cooperating spring biasing means.

A problem arises in such cartridge solenoid valves in that it is desirable at times to operate the valve manually, such as to close or open the valve in the event of a failure of the solenoid.

In one known device, a knob is threadedly associated with the structure to permit override of the solenoid control.

DISCLOSURE OF INVENTION

The present invention comprehends an improved valve structure having a fast acting manual override for control of the pilot valve.

More specifically, the invention comprehends the provision in a valve having a housing, a movable flow control element in the housing, a movable pilot valve in the housing for controlling the position of the flow control element, a reciprocally movable control member associated with the pilot valve for positioning the pilot valve, and electrically operable means for selectively positioning the control member of means for providing a fast-acting manual override of the electrically operable means including a manually operable element, means for connecting the manually operable element to the control member, releasably engageable shoulder means including a first shoulder in fixed relationship to the housing and a second shoulder movable with the control member, and means responsive to selective manipulation of the manually operable member for (a) selectively positioning the shoulder means for locking the control member in a preselected position, or (b) releasing the control member, for effecting selective manually controlled positioning of the flow control element such as in the event of failure of the electrically operable means.

In the illustrated embodiment, the manually operable element comprises a knob.

In the illustrated embodiment, the shoulder means comprises means defining a slot and cooperating means defining a projection movable therein lengthwise of the slot.

In the illustrated embodiment, the slot includes a first portion extending in the direction of reciprocation of the pilot valve control member, and a second portion extending transversely thereto.

In the illustrated embodiment, means are provided for biasing the control member away from the preselected position.

In the illustrated embodiment, the biasing means includes a spring extending between the housing and the manually operable element.

The invention comprehends the provision of latch means mounted to the housing for releasably latching the control member to maintain the valve means in the preselected position and sealing means for sealing the control member to the housing wherein the sealing means is arranged to be accessible for servicing upon removal of the latch means from the housing.

In the illustrated embodiment, the latch means includes a guide threadedly secured to the housing for adjustably compressing the sealing means.

The valve structure of the present invention is extremely simple and economical of construction while yet providing the highly desirable, fast-acting manual override functioning discussed above.

BRIEF DESCRIPTION OF THE DRAWING

Other features and advantages of the invention will be apparent from the following description taken in connection with the accompanying drawing wherein:

FIG. 1 is a perspective view of a valve having a fast-acting manual override structure embodying the invention;

FIG. 2 is a transverse enlarged section thereof taken substantially along the line 2—2 of FIG. 1; and FIG. 3 is a projected view illustrating the arrangement of the slot of the fast-acting manual override means.

BEST MODE FOR CARRYING OUT THE INVENTION

In the illustrative embodiment of the invention as disclosed in the drawing, a solenoid valve generally designated 10 is shown to comprise a poppet valve having a main valve member 11 selectively removably seated on a valve seat 12.

Movement of the main valve is constrained by a guide 13 movable in a guiding portion 14 of the valve seat. Movement of guide 13, in turn, is effected by corresponding movement of a pilot valve 15, the disposition of which is normally controlled by a plunger 16 which, in turn, is selectively positioned by a solenoid coil 17 concentrically surrounding the plunger. The plunger is movable in a sleeve tube 18 which is closed at its upper end by plug 19 and which is connected at its lower end to the valve seat through a coupling nut adapter 20.

A biasing spring 21 is compressed coaxially between plug 19 and plunger 16 so as to bias the plunger downwardly, as seen in FIG. 2, against the action of the electrically operable solenoid coil means 17.

The present invention, as indicated briefly above, is concerned with the provision of manual override means for effecting controlled positioning of the pilot valve 15 when desired. More specifically, as seen in FIG. 2, the manual override means generally designated 22 is mounted to the upper end portion 23 of plug 19 which, as seen in FIG. 1, extends upwardly from an encapsulating coil 17 surrounding the plunger 16 and plug portions 19 of the valve structure. The valve structure may be removably secured in coil 17 by means of a nut 25 threaded to a threaded end portion 26 of the plug, as illustrated in FIG. 1.

Plug end portion 23 defines an outwardly opening recess 27. The recess defines an innermost, small diameter, cylindrical portion 28 receiving a sealing, O-ring 29. Outwardly of recess portion 28, the recess 27 is provided with an enlarged diameter cylindrical portion 30 receiving a washer 31. Outwardly of recess portion 30, recess 27 defines a further enlarged recess portion 32 which is threaded to receive a corresponding threaded portion 33 of a guide 34. The innermost end 35 of the guide defines a reduced diameter, cylindrical portion which abuts washer 31 in plug recess portion 30. Sealing compression of O-ring 29 is effected by adjusting the threaded engagement of the guide portion 33 in the plug threaded recess 32.

It should be noted upon threaded removal of the guide threaded portion 33 from the plug, washer 31 and O-ring 29 may be readily removed, such as for maintenance and replacement as desired.

As further seen in FIG. 2, guide 34 defines an outer portion 36 provided with an outwardly opening axial recess 37 slidably receiving the stem 38 of a knob 39. The knob includes an outer knurled portion 40 adapted for fingertip manipulation thereof.

Knob stem 38 is both axially and rotatively slidable in the guide recess 37.

A control member 41 defines an outer end 42 fixedly retained in the knob stem by a set screw 43. The control member extends coaxially downwardly through an opening 44 in the lower end portion 35 of the guide, through O-ring 29, and through an axial bore 45. The lower end 46 of the control member extends through a bore 47 in the plunger 16 and is provided at its tip with an enlarged head portion 48 received in an enlarged recess 49 at the lower end of the bore 47 outwardly of the pilot valve 15.

As seen in FIG. 2, coil spring 21 is disposed coaxially about control member portion 46 within an outwardly opening recess 50 at the outer end of bore 47.

Knob 39 is biased outwardly by a coil spring 51 coaxially surrounding control member portion 42 within the threaded inner portion 33 of guide 34.

As further shown in FIG. 1, outer portion 36 of guide 34 is provided with an L-shaped slot 52 slidably receiving the outer end 53 of set screw 43. As seen in FIGS. 1 and 3, the slot defines a closed longitudinal portion 54 extending parallel to the direction of movement of the pilot valve and a transverse portion 55 extending circumferentially of guide portion 36 and, thus, perpendicularly to the direction of movement of the pilot valve. At its distal end, the slot portion 55 defines an inturned recess 56 for removably latching the set screw end 53 to retain the control knob in its innermost disposition.

When the control knob 39 is manipulated by suitable fingertip grasping of portion 40 so as to urge the set screw end portion 53 from the recess 56 against the biasing action of spring 51 and thence into alignment with the longitudinal portion 54 of the slot, release of the knob portion 40 permits spring 51 to quickly throw the control member 41 to its outermost disposition wherein the head portion 48 bottoms in the recess 49. The force of the pressure acting on head 48, together with the force of spring 51, causes the control member to urge the plunger 16 to the open position wherein the plunger seats against the plug 19. In effecting this movement, the force of spring 50 is overcome.

To permit normal operation of the valve under control of the solenoid coil 17, the user merely manipulates knob 39 downwardly so as to move the set screw head portion 53 through slot portions 54 and 55 to recess 56, as illustrated in FIG. 3. This locks the override control in the inoperative position wherein the control member head 48 is in the lower disposition illustrated in FIG. 2, thus permitting the plunger 16 to be operated in the normal manner by solenoid coil 17.

INDUSTRIAL APPLICABILITY

The cartridge valve 10 of the present invention is adapted for use in a wide range of industrial applications wherein cartridge-type poppet and spool valves are utilized. The valve may be utilized to function in the normal manner wherein control of the disposition of the main valve by the pilot valve is effected by suitable energization of the electrically operable solenoid coil means. However, when it is desired to effect a manual override of the automatic coil operation of the valve, the user may effect such override by manipulation of the control knob 39, as discussed above. Normal solenoid coil operation is effected by the control member 41 is retained in its inner disposition by the engagement of the latch means defined by the control knob set screw with the recessed portion 56 of the guide 34.

When it is desired to override the solenoid control, the user need merely manipulate portion 40 of the knob 39 so as to bring the set screw head portion 53 into alignment with the longitudinal portion 54 of slot 52, whereupon release of the control knob permits the spring and fluid pressure to act on control member 41 suitably to bring the plunger 16 to the outer seated disposition.

The foregoing disclosure of specific embodiments is illustrative of the broad inventive concepts comprehended by the invention.

We claim:

1. In a valve having a housing, a flow control element movable in said housing between a valve open position and a valve closed position, a movable pilot valve in said housing for controlling the position of said flow control element, a reciprocally movable solenoid plunger associated with the pilot valve for positioning the pilot valve, and electrically operable coil means for selectively positioning the plunger, means for providing a fast-acting manual override of said electrically operable coil means comprising:

a manually operable element;
   a control member for connecting the manually operable element to said solenoid plunger;
   releasably engageable shoulder means defining a first shoulder in fixed relationship to said housing and a second shoulder movable with said manually operable element, said means defining said second shoulder further defining means releasable securing the manually operable element to said control member; and
   means responsive to selective manipulation of said manually operable element for selectively positioning the shoulder means for (a) locking said control member in a preselected first position wherein the solenoid plunger is operable by the electrically operable coil means or (b) releasing said control member in a second position; and
   means for rapidly effecting manually controlled override of the electrically operable coil means and positioning of the flow control element in the valve open position with the shoulder means in the second position such as in the event of failure of said electrically operable means.

2. The valve structure of claim 1 wherein said manually operable element comprises a knob.

3. The valve structure of claim 1 wherein said shoulder means comprise means defining a slot and cooperating means defining a projection movable therein lengthwise of the slot.

4. The valve structure of claim 1 wherein said shoulder means comprise means defining a slot and cooperating means defining a projection movable therein lengthwise of the slot, said slot having a first portion extending in the direction of reciprocation of the solenoid plunger and a second portion extending transversely thereto.

5. The valve structure of claim 1 wherein said shoulder means comprise means defining a slot and cooperating means defining a projection movable therein lengthwise of the slot, said slot having first and second portions extending in the direction of reciprocation of the solenoid plunger and a third portion extending transversely thereto.

6. The valve structure of claim 1 wherein said shoulder means comprise means defining a slot and cooperating means defining a projection movable therein lengthwise of the slot, said slot having first and second portions extending in the direction of reciprocation of the solenoid plunger and a third portion extending transversely between said first and second portions.

7. The valve structure of claim 1 wherein said shoulder means comprise means defining a slot and cooperating means defining a projection movable therein lengthwise of the slot, said slot having first and second portions extending in the direction of reciprocation of the solenoid plunger and a third portion extending transversely thereto, said first and second portions having different longitudinal extents.

8. The valve structure of claim 1 wherein said shoulder means comprise means defining a slot and cooperating means defining a projection movable therein lengthwise of the slot, said slot having first and second portions extending in the direction of reciprocation of the solenoid plunger and a third portion extending transversely thereto, said first and second portions having different longitudinal extents, the length of the shorter being less than the corresponding dimension of the projection whereby the projection projects from said shorter transverse slot portion when received therein.

9. The valve structure of claim 1 wherein said manually operable element defines means for rapidly effecting manually controlled override of the electrically operable coil means and positioning of the flow control element in the valve open position with the shoulder means in the second position such as in the event of failure of said electrically operable means, and means are provided for biasing the solenoid plunger away from said preselected first position.

10. The valve structure of claim 9 wherein said biasing means includes a spring extending between said housing and said manually operable element.

11. The valve structure of claim 9 wherein said biasing means includes a guide carried by the housing and a spring extending between said guide and said manually operable element.

12. The valve structure of claim 9 wherein said biasing means includes a guide carried by the housing and slidably carrying said manually operable element and a spring extending between said guide and said manually operable element.

13. The valve structure of claim 9 wherein said biasing means includes a guide carried by the housing and slidably carrying said manually operable element and a spring extending between said guide and said manually operable element, said guide defining said first shoulder means.

14. The valve structure of claim 1 further including sealing means within the housing for sealing the control member to said housing, said sealing means being arranged to be accessible for servicing upon removal of the manually operable element from the control member.

* * * * *